March 8, 1966 M. I. MENKIS 3,239,722
ELECTRICAL CONTROL SYSTEM
Filed April 4, 1961

INVENTOR:
MURRAY I. MENKIS
BY
ATTORNEY

United States Patent Office 3,239,722
Patented Mar. 8, 1966

3,239,722
ELECTRICAL CONTROL SYSTEM
Murray I. Menkis, West Orange, N.J., assignor to G-V Controls Inc., Livingston, N.J., a corporation of New Jersey
Filed Apr. 4, 1961, Ser. No. 100,666
3 Claims. (Cl. 317—142)

This invention relates to an electrical control system, and more particularly to such a system wherein a device whose condition may be used to control functions outside the system is in one condition while the system is subjected to energization by an energizing source, and assumes another condition at the end of a predetermined time interval beginning with the cessation of such energization.

It is an object to provide such a system which during energization does not steadily consume power from the energizing source. It is an object to provide such a system which during the interval abovementioned does not consume source power.

It is an object to provide such a system which may be physically embodied within small dimensions. It is an object to provide a simple and inexpensive such system.

It is an object to provide a generally improved such system. Other and allied objects will appear from the following description and the appended claims.

A preferred but non-limitative system in accordance with my invention operates by the charging, while the system is first subjected to energization by the source, of two electric-energy storing devices; by the discharge at a finite rate, beginning when such energization ceases, of a first of those devices whereby progressively to change the voltage differential between the charges of the two devices; and by the triggering of a suitable electric breakdown device into operation when that differential passes beyond a critical value. A two-condition electrical control device, which was caused to assume a first condition when the system was first subjected to such energization, is caused by the operation of the breakdown device to assume a second condition. The triggering of the breakdown device into operation, and thus the assumption by the control device of its second condition, will occur at the end of a time or delay interval, following cessation of energization of the system by the source, which is predetermined by suitable parameters of the system.

In the detailed description of my invention hereinafter set forth reference is made to the accompanying drawing, in which.

The several illustrated embodiments of my invention employ an electrical control device to which two different energizations may be applied and which assumes one or the other of two conditions according to which of those energizations was last applied. Such a device may take any of a variety of forms, of which magnetic-core switches and permanent-magnet "latching" relays are two examples. Because of its greater simplicity of principle the permanent-magnet latching relay is used herein for purposes of illustration, but it will be understood that no unexpressed limitation thereto is intended.

Figure 1:
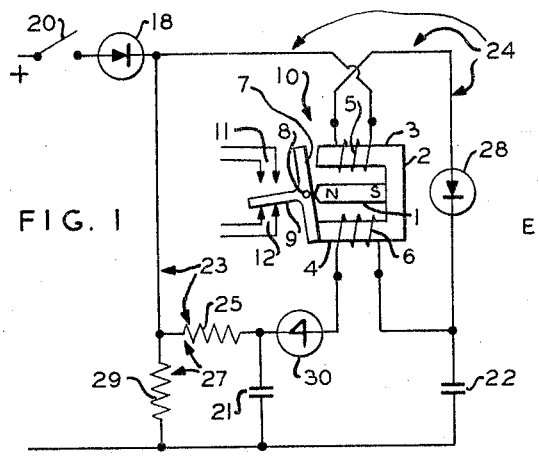
FIGURE 1 is a schematic circuit diagram illustrating one embodiment of the invention.

That form of electrical control device may be seen, for example in FIGURE 1, to comprise the magnetic latching relay 10 having a permanent magnet 1; a C-shaped core 2, typically of non-retentive magnetic material, arranged about the magnet 1 to form an E-shape in which the magnet provides the central bar or "leg" and the core provides the outer legs 3 and 4; and an armature 7 of non-retentive magnetic material centrally pivoted as at 8 in close adjacency to the free end of the magnet 1, the core legs 3 and 4 having lengths suitably restricted relative to that of the magnet 1 so that when the armature 7 is rocked into contact with the end of one of them, it is spaced from the end of the other, and vice versa. It is well known with respect to such a relay that if its core be sufficiently energized magnetically in one polarity the armature will be attracted into one of its two limiting positions predetermined by that polarity and the polarity of the magnet, whereas if the core be sufficiently energized in the opposite polarity the armature will be attracted into the other of those limiting positions. It will be understood that with such a control device that two different energizations will consist of magnetic energizations of its core in respectively opposite directions.

The alternate rocking of the armature 7 between its two limiting positions is the immediate control action of the control device 10. The ultimate control action may be any desired one responsive to that rocking; and, purely by way of example, FIGURE 1 indicates an electrical switch blade 9 secured to and rocked by the armature, and two different groups of contacts 11 and 12 arranged to be alternately closed by the blade 9.

The appropriate alternate applications of the two energizations to the control device are effected by the circuitry associated with that device. This circuitry comprises first a switch 20 by which the system as a whole may be subjected to electric energization, together with a rectifier 18 which is however required only if the energizing source (not shown) be of A.C.; the rectifier, if employed, being interposed in one of the two input conductors to the system. The circuitry secondly comprises two electric-energy storing devices, typically capacitors 21 and 22, one terminal of each of which may be connected to the unswitched one of the input conductors to the system. Thirdly there are provided for the energy-storing devices respective charging circuits 23 and 24 leading from the switched input conductor to the other terminals of those devices respectively. Fourthly there is provided a discharge circuit 27 normally effective with respect to the first only of the energy-storing devices (e.g. in FIGURE 1, with respect to the capacitor 21), this circuit in FIGURE 1 comprising the resistor 29 connected from the charging circuit 23 to the unswitched input conductor; in order normally to prevent its also acting as a discharge circuit for the storing device 22, there may be connected in suitable polarity in the charging circuit 24 for the latter a rectifier 28.

In one of the charging circuits 23 and 24 there is connected means for applying one of the two energizations to the control device. In the embodiment of FIGURE 1 this is shown as a coil 5 surrounding the core leg 3 and connected in the charging circuit 24 of the second storing device.

Let it be assumed that the switch 20 is open, the storing devices discharged, and the armature 7 of the control device in the position—which it may be considered is illustrated in FIGURE 1—opposite to that which it will be attracted when current is supplied to the coil 5. Upon the closing of the switch charging currents will flow through the respective charging circuits into the storing devices; the flow of current in the charging circuit 24 passing through the coil 5, thus magnetically energizing the core 2 in the direction appropriate to throwing of the armature 7 to the position opposite to that illustrated. Preferably the resistance of the coil 5 will be kept low, so that the charging of the storing device 22 will be very rapid; the rate of charging of the device 21 may desirably be at least roughly equalized with that of the device 22 by the insertion in the charging circuit 23—for example, in that part of it which is common with the discharge circuit 27—of a low valued resistor 25. In short order, then, after the closing of the switch 20 the storing devices 21 and 22 will be for all practical purposes fully charged. When the switch 20 is at some time thereafter opened, the storing device 21 will discharge through the discharge circuit 27, which is however unavailable as a discharge circuit for the storing device 22 in view of the rectifier 28; thus the difference between the voltages to which the two storing devices are charged, or the voltage differential between their charges, will progressively change, in the system of FIGURE 1, from the zero difference which characterizes those voltages while the switch 20 remains closed.

The basic objective, stated in terms of the system of FIGURE 1, is that at the expiration of a predetermined time interval following opening of the switch 20 the armature 7 of the control device 10 will be thrown to the position opposite to that which it occupies while the switch 20 is closed, i.e., will be thrown back to the illustrated position. The invention involves the accomplishment of this objective with the aid of a two-state electric device connected with the storing devices and responsive to the voltage differential between their charges, this two-state device having a path which is substantially conductive only upon that differential changing, from the value which it has while the storing devices are charged, to one on the opposite side of a critical value therefrom; in the system of FIGURE 1 that differential while the storing devices are charged is zero, and accordingly it is required that the two-state-device path be substantially conductive only upon the differential changing to a value just exceeding a critical one.

Such a device is preferably an electric breakdown device having a path in and across which there may occur the breakdown phenomenon of joint current increase and terminal-voltage decrease, the device being responsive in the manner stated in the preceding paragraph. In the system of FIGURE 1 such a device may be so-called four-layer semi-conductor diode 30; this device itself is well understood as a form of n-p-n-p transistor in the several layers of which the diffusion of impurities has been controlled in such a manner that with rising voltage across the diode terminals the resistance of the diode remains extremely high until a critical voltage is exceeded, whereupon the device experiences electric breakdown and the resistance becomes very low and remains very low so long as a substantial current continues to flow through the diode.

The invention involves the connection of the path which becomes substantially conductive in the stated manner, or in and across which breakdown occurs, in discharging relationship to the second storing device.

When a four-layer diode or equivalent device is used in the simplest manner, the terminals of that path, i.e., the terminals of the diode, constitute the control terminals to the voltage between which the device is responsive; in order to render such a device responsive to the voltage differential between the storing devices, it must be connected (permissibly through another element in series with it, as hereinafter mentioned) between the storing devices, i.e., between the non-common terminals thereof, with its forward-current direction in discharging relationship to the second storing device, as has been illustrated in FIGURE 1. Thus the relationship of the path to the second storing device required by control-terminal considerations is inherently appropriate to the effecting of a discharge of the second storing device into the first; a discharge of the second storing device which, while not total, is a very substantial one, since the diminution of charge of the first storing device which must have occurred in order to invoke the conductivity of the path, or breakdown therein and thereacross, will have inherently prepared the first storing device to receive a substantial portion of the charge of the second. Thus when, during the discharge of the first storing device, the voltage differential between the storing devices passes a critical value, the four-layer diode will experience electric breakdown, the resistance of its inter-terminal path will change abruptly from extremely high to very low, and the second storing device will discharge for a time through that path into the first.

This discharge is utilized to apply to the control device 10 the energization which is opposite to that applied during charging of the storing devices, and which will therefore throw the armature of the control device 10 back to the position it occupied prior to closure of the switch 20, i.e., to the position illustrated in FIGURE 1. In the system of that figure this is simply accomplished by providing on the core leg 4 of the control device a coil 6, and inserting this coil in series with the four-layer diode 30 in the appropriate polarity.

Figure 2:
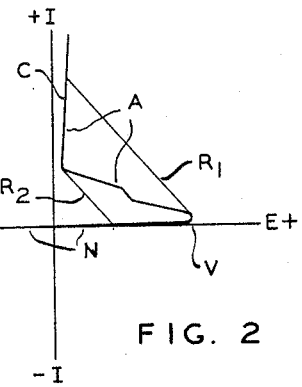
FIGURE 2 is a graph illustrating the typical characteristic of a particular breakdown device which may be employed in the embodiment of FIGURE 1.

The breakdown action of the four-layer diode itself is graphically portrayed by the characteristic A in FIGURE 2, which is a plot of current ordinates against voltage abscissae. The characteristic A represents the current through the diode (considered positive, and thus forward, when in a right-to-left direction as that diode is disposed in FIGURE 1) at various voltages (considered positive when the potential at the righthand side in FIGURE 1 is more positive than that at the lefthand) across the diode. The resistance of the diode at any point on the characteristic A is the quotient of the abscissa by the ordinate of that point; it will readily be seen that at any negative voltage across the diode (so long as it is not in excess of a limiting value L not reached across the diode in the practice of the invention) the resistance of the diode is extremely high, and that as the voltage across the diode increases from a negative or zero value through a range of positive values the resistance at first remains likewise extremely high, the portion N of the characteristic representing this state of affairs.

Upon the increasing positive voltage reaching a critical value V the characteristic curves upwardly and to the left to approach the vertical axis, and only then re-curves into an essentially straight section C extending nearly vertically upwardly while digressing only gradually to the right from the vertical axis (and which if projected downwardly would approximately intersect the origin or axis intersection).

When the switch 20 is opened and the storing device 20 begins to discharge, the voltage differential between the storing devices increases from zero and the value of current through the coil 6 and four-layer diode 30 of FIGURE 1 follows the portion N of the characteristic, i.e., remains essentially at zero, up to the critical-voltage point V, and continues to follow that characteristic around a substantial part of the upward-and-leftward curve in this region. At the point where the characteristic A becomes tangent with the most rightward line $R_1$ which can be drawn at the angle which represents the effective resistance of the coil 6, the current value may be considered as crossing instantly along that line to the intersection of that line with the conductive portion C of the characteristic. The now relatively high current value represents the initiation of discharge of the second storing device 22 through the coil 6 and the four-layer diode 30; the voltage differential between the capacitors, which at this instant will have reached the value represented by the intersection of the line $R_1$ with the voltage axis, being divisible into a part (represented by the abscissa of the intersection of C and $R_1$) constituting voltage across the four-layer diode 30 and a remainder constituting voltage across the coil 6.

As the discharge of the second storing device into the first progresses the voltage differential will rapidly diminish, and the current value will diminish along the portion C of the characteristic A and partially around the curve at the bottom of that portion. At the point where the characteristic becomes tangent with the most leftward line $R_2$ which can be drawn at the angle which represents the effective resistance of the coil 6, reached by the current when the voltage has reached the intersection of $R_2$ with the characteristic portion N, the current value may be considered as crossing instantly along that line $R_2$ to that intersection and as then being for all practical purposes extinguished. It is during the initial part of the time while the current has values along the portion C of the characteristic that the control device 10 will be energized to throw the armature 7 back to the illustrated position. With a suitably low value of effective resistance of the coil 6 the duration of this whole time will be minute relative to the time interval through which the first storing device was discharging before breakdown occurred; accordingly that time interval remains the essential determinant of the delay intervening between the opening of switch 20 and the throwing of the armature 7.

That time interval, and thus that delay, is established by the nature of the discharge characteristic of the first storing device, by the ratio of the critical voltage of the two-state or breakdown device to the voltage applied to the system prior to switch opening, and by the capacity-resistance product of the storing device 21 and the discharge circuit 27. Purely by way of example and assuming the storing device 21 to be a capacitor as illustrated, then if that ratio were $(e-1)/e$ (wherein $e$ is the base of the Naperian system of logarithms, or 2.71828) that time interval in seconds would be equal to that product in megohms-microfarads; a smaller ratio would result in a shorter time interval, and a larger ratio in a longer one, in accordance with the logarithmic discharge characteristic of capacitors.

While in general capacitors are a preferred form of electric-energy storing devices for short and medium time intervals, the invention is not in all aspects limited to their use. Thus in FIGURE 3 I have shown a system basically similar to that of FIGURE 1 but wherein an accumulator form of electric battery i.e., a storage battery is employed for each of the storing devices, which are therein designated as 121 and 122 respectively; this has potential advantages when quite long time intervals are to be accommodated. The nature of the discharge characteristic will vary as between different types of batteries, and may be expected to depart widely from simple logarithmic nature; it is therefore impossible to state generic formulae for the influence of the discharge-circuit resistance and battery capacity on time interval, but that may readily be determined by test for any particular form of battery.

The polarities illustrated for the rectifiers and for the four-layer diode in FIGURE 1 are of course appropriate to a positive polarity of the non-common terminals of the energy-storing devices. It is however equally permissible that that polarity be negative, in which event those rectifier and diode polarities will all be reversed, as by way of example illustrated in FIGURE 3.

Figure 3:
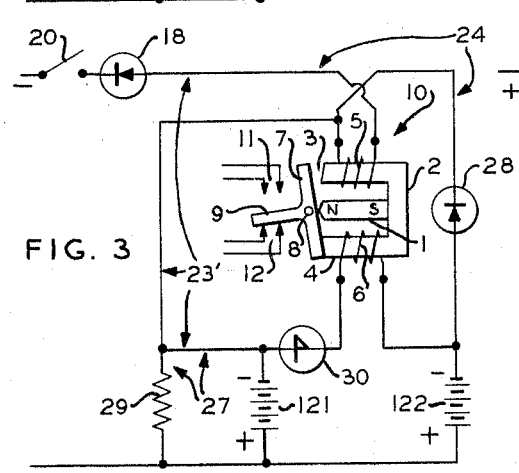
FIGURES 3, 4, 5 and 6 are schematic circuit diagrams of four respective modified embodiments of the invention.

The means for applying the first of the two energizations to the control device 10 was illustrated in FIGURE 1 as responsive to the flow of current in the charging circuit 24 of the second energy-storing device. It is however permissible that it be responsive to the flow of current in either one or both of the charging circuits; the latter of these alternatives is illustrated in FIGURE 3, wherein the coil 5 is included in the first-device charging circuit, therein designated 23', as well as in the second-device charging circuit 24. The resistor 25 of FIGURE 1 may for example be omitted as now unnecessary.

Figure 4:
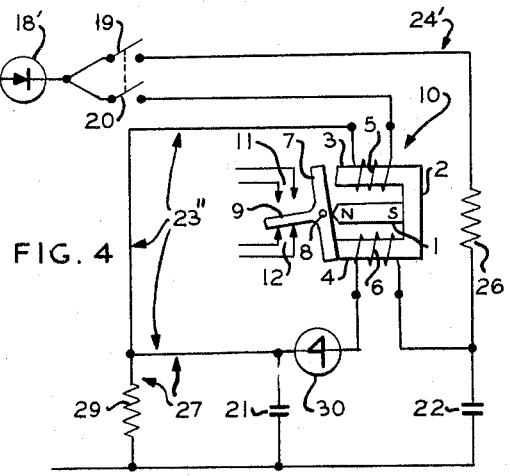

In FIGURE 4 I illustrate the former of the alternatives just mentioned, i.e., the first of the two energizations being responsive to the flow of current in only the first-device charging circuit, therein designated 23'', FIGURE 4 otherwise showing basically a system similar to that of FIGURE 1. In this case a small-valued resistor 26 in the charging circuit 24 may be desirable instead of the resistor 25 in the circuit 23 of FIGURE 1.

In FIGURE 4 I also illustrate an expedient, alternative to the rectifier 28 of FIGURE 1, for normally precluding the discharge of the second storing device 22. This is the connection of the second-device charging circuit, therein designated 24', to the energizing source not through the switch 20 through which the first-device charging circuit 23'' is connected to that source, but instead through a separate switch pole 19 mechanically interlinked with the pole of switch 20 so that the two poles are closed and opened together to and from their respective contacts, with which they form a double-pole single-throw switch. In this event the rectifier which may be employed because of an A.C. nature of the source may conveniently be placed between the two switches on the one hand and the source on the other, and is designated as 18' in this figure.

The two respective energizations of the control device 10 do not necessarily require respective coils such as 5 and 6 of FIGURES 1, 3 and 4, but may instead be effected by oppositely directed current flows through a single coil or coil system—provided the remainder of the circuitry be suitably arranged. Thus in FIGURE 5 I illustrate the control device 10 as provided with a single coil system 56, which may for example consist of the coils 5 and 6 of earlier figures interconnected (without any necessary intervening terminal) in series with each other. The coil system 56 may be serially interposed in the second-device charging circuit, herein designated 24'', in which the rectifier 28 will again be serially connected, and the first-device charging and discharging circuits 23 and 27 may again be provided as in FIGURE 1.

Figure 5:
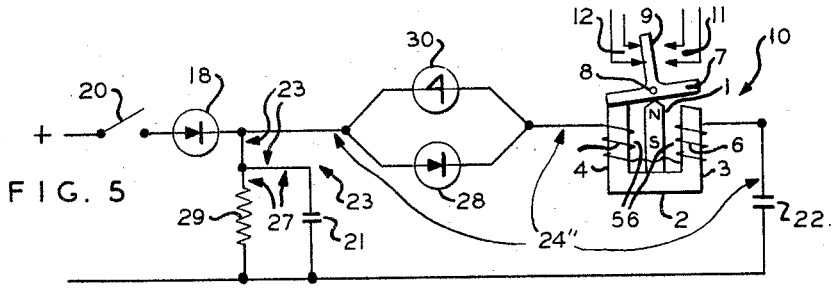

The system as thus far described will be seen to be basically similar to that of FIGURE 1, excepting that the coil system 56 has been substituted therein for the single coil 5; it should, however, be pointed out in this connection that the use of any appreciably-valued resistor such as 25 of FIGURE 1 may be undesirable, and accordingly no such resistor has been shown in FIGURE 5. The four-layer diode 30 is again employed, and is again to be connected between the non-common terminals of the storing devices 21 and 22, with the coil system 56 serially interposed in the connection. With the system shown in FIGURE 5 such a connection of the device 30 is accomplished by the simple expedient of placing the four-layer diode in parallel with the rectifier 28. This does not harm the function of the rectifier of blocking the discharge of the second storing device 22, for the four-layer diode is of course non-conductive in the direction for discharge of that storing device until there is reached the state of affairs under which that diode intendedly breaks down; on the other hand the presence of the rectifier 28 in parallel to it in no way affects the breakdown function of the four-layer diode.

The coil system 56 is of course so arranged on the core 2 that when the switch 20 is closed the flow of charging current through the rectifier 28 into the storing device 22 will, in passing through the coil system, apply energization in one direction to the core 2 to throw the armature 7 from the illustrated position to the opposite position. On the breakdown of the four-layer diode at the expiration of a time interval following opening of switch 20, the flow of discharge current from the storing device 22 through the diode, inherently passing through the coil system 56 in the opposite direction, will of course apply to the core 2 an energization in the opposite direction, thus throwing the armature back to the illustrated position.

Figure 6:
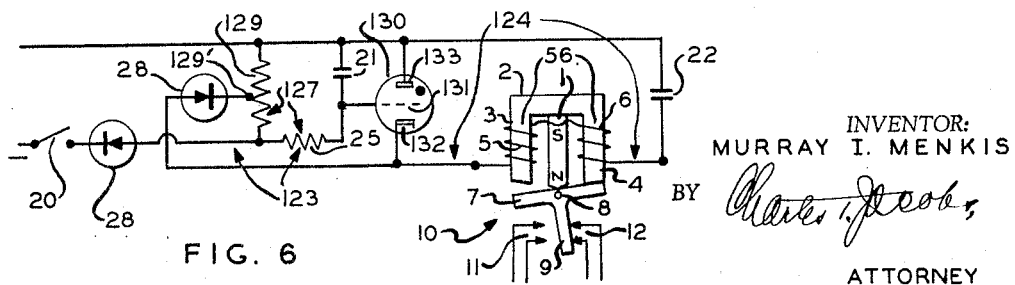

All of the embodiments of my invention above described involve the charging of the storing devices to the same potential. Furthermore all of them involve the use, for the two-state or breakdown device, of a four-layer diode, or, in broader terms, of a device wherein the terminals of the path which becomes conductive in the manner stated above, or in and across which breakdown occurs, are themselves the control terminals to the voltage between which the device is responsive. My invention in its broader aspects is not, however, necessarily limited in respect of any of these features, as may be understood from a further embodiment which is illustrated in FIGURE 6.

Herein the energy-storing devices are again shown as capacitors 21 and 22, in this instance with their upper-shown terminals connected together and to the unswitched input conductor, which if a D.C. energizing source is used may be the positive one; in the other input conductor will be connected the switch 20 (and, if an A.C. source be used, also the rectifier 18 in suitable polarity to render this conductor negative). The charging circuit 123, permissibly including the small-valued resistor 25, may be connected from the switched input conductor to the non-common terminal of the first storing device 21; a discharge circuit 127 for this device may include the resistor 25 and a resistor 129 connected between the input conductors inside the switch 20. The charging circuit 124 for the second storing device may be connected from the non-common terminal of that device to a point which, when the switch 20 is closed, will be of potential intermediate that of the input conductors—purely by way of example, a mid-potential therebetween—and which may conveniently be provided by a tap 129′ on the resistor 129; the rectifier 28 of previous figures may be connected in this circuit, for example adjacent the tap 129′ in suitable polarity to permit charge but to preclude discharge of the storing device 22 through this circuit. The coil system 56 may be serially interposed in this circuit 124.

In this embodiment the two-state or breakdown device is a gas-filled triode or thyratron 130 whose cathode 132 may be heated from any convenient local source (not shown). In such a device the path in and across which breakdown occurs in its anode-to-cathode path; this path is placed in discharging relationship to the second storing device 22 by connection of the anode 133 to the commonly connected (positive) terminal of that storing device, and by connection of its cathode to the charging circuit 124 on the electrically far side of the coil system 56 from the storing device 22. The control terminals to the potential between which the device 130 is responsive are the cathode 132 and the grid 131 of the device; these are connected between the storing devices, the cathode 132 being connected to the non-common terminal of the device 22 by virtue of its connection to the charging circuit 124 just described, and the grid 131 being connected directly to the non-common terminal of the storing device 21.

Upon closing of the switch 20 charging currents will flow through the charging circuits into the respective storing devices, the flow of current through the charging circuit 124 passing through the coil system 56 and subjecting the core 2 of the control device 10 to a magnetic energization appropriate to throwing of the armature 7 to the position opposite to that illustrated, and in short order the storing devices will be for all practical purposes fully charged, the storing device 22 in this instance, to a voltage only a fraction of that to which the storing device 21 is charged, so that the potential of its non-common terminal and that of the cathode 132 is substantially less negative than that of the non-common terminal of the device 21.

When the switch 20 is at some time thereafter opened, the storing device 21 will discharge through the discharge circuit 127, which is however unavailable as a discharge path for the storing device 22 in view of the rectifier 28; thus at first the full voltage to which the storing device 22 has been charged will remain impressed between plate 133 and cathode 132 of the device 30, the cathode thus remaining at the potential (relative to that of the unswitched input conductor) to which it was brought while the switch 20 was closed. At the beginning of the discharge of the storing device 21 the potential of its non-common terminal, and therefore that of the grid 131, was very substantially more negative than that of the cathode 132; as the discharge progresses, however, that potential (of the terminal of 21 and of the grid) becomes less and less negative, and thus the voltage differential between the grid 131 and the cathode 132 progressively changes. When this voltage differential passes a critical value characteristic of the device 130, the anode-to-cathode path of that device will break down electrically, abruptly discharging the storing device 22, in this case to essentially zero voltage, since the discharge no longer occurs into the first storing device. The discharge current will of course pass through the coil system 56 in the direction opposite to that of the device 22 charging current, and thus the core 2 of the control device 10 is subjected to magnetic energization opposite to that which threw the armature 7 out of the illustrated position and thus resulting in a throwing of that armature back into that position.

The critical voltage between grid 131 and cathode 132 beyond which the anode-cathode path 133–132 of the device 130 will experience breakdown may by suitable choice of that device be made close to a zero value of voltage, freedom to do which (without entailing absurdly short delay intervals following opening of switch 20) results from the difference between the voltages to which the storing devices are charged. In turn the near-zero value of the critical voltage differential minimizes dependence of the delay interval on the voltage which during charging was available from the source, and thus obviates any need or urge to resort to special expedients for stabilizing that voltage in order accurately to control the time interval of delay with which the control device 10 will be energized following opening of switch 20.

While I have disclosed my invention in terms of particular embodiments thereof, it will be understood that I intend thereby no unnecessary limitations. Modifications in many respects will be suggested by my disclosure to those skilled in the art, and such modifications will not necessarily constitute departures from the spirit of the invention or from its scope, which I undertake to define in the following claims.

I claim:

1. An electrical control system comprising, in combination, two electric-energy storing devices; a circuit through which the first storing device may be charged and a circuit through which the second storing device may be charged; discharge means normally effective with respect to the first only of the storing devices; an electric breakdown device operatively connected with the storing devices and including a path in and across which there may occur the breakdown phenomenon of joint current increase and terminal-voltage decrease, said electric breakdown device being responsive to voltage differential between the charges of the first and second storing devices, lying on the opposite side of a critical value from that differential as it exists when the storing devices are charged, said path being disposed in discharging relationship to the second storing device; an electrical control device to which two different energizations may be applied and which assumes one or the other of two conditions according to which of said energizations was last applied; means responsive to the flow of current in at least one of said charging circuits for applying one of said energizations to said control device; and means responsive to the flow of substantial current in said path for applying the other of said energizations to said control device.

2. An electrical control system comprising, in combination, two electric-energy storing devices; a circuit through which the first storing device may be charged and a circuit through which the second storing device may be charged; discharge means normally effective with respect to the first only of the storing devices; an electric breakdown device operatively connected with the storing devices and including a path which passes negligible current until there is applied across its terminals voltage of predetermined polarity and of a value greater than a critical one whereupon there will occur the breakdown phenomenon of joint current increase in and terminal-voltage decrease across said path, said path lying between the storing devices in discharging relationship to the second storing device; an electrical control device to which two different energizations may be applied and which assumes one or the other of two conditions according to which of said energizations was last applied; means responsive to the flow of current in at least one of said charging circuits for applying one of said energizations to said control device; and means responsive to the flow of substantial current in said path for applying the other of said energizations to said control device.

3. An electrical control system comprising, in combination, two electric-energy storing devices; a circuit through which the first storing device may be charged and a circuit through which the second storing device may be charged; discharge means normally effective with respect to the first only of the storing devices; a four-layer semi-conductor diode operatively connected between the storing devices with its forward-current direction in discharging relationship to the second storing device; an electrical control device to which two different energizations may be applied and which assumes one or the other of two conditions according to which of said energizations was last applied; means responsive to the flow of current in at least one of said charging circuits for applying one of said energizations to said control device; and means responsive to the flow of substantial forward current through said diode for applying the other of said energizations to said control device.

References Cited by the Examiner

UNITED STATES PATENTS 2,635,197  4/1953  Routledge et al. ___ 317—151 X

FOREIGN PATENTS 548,405  10/1942  Great Britain.
549,998  12/1942  Great Britain.

SAMUEL BERNSTEIN, *Primary Examiner.*

WALTER L. CARLSON, *Examiner.*

L. T. HIX, *Assistant Examiner.*